United States Patent
Paik

(10) Patent No.: US 11,311,978 B2
(45) Date of Patent: Apr. 26, 2022

(54) LCD GLASS LAPPING APPARATUS

(71) Applicant: XTR TECHNOLOGIES INC., Grapevine, TX (US)

(72) Inventor: Robert Sunghyun Paik, Irving, TX (US)

(73) Assignee: XTR TECHNOLOGIES INC., Grapevine, TX (US)

( * ) Notice: Subject to any disclaimer, the term of this patent is extended or adjusted under 35 U.S.C. 154(b) by 0 days.

(21) Appl. No.: 17/144,610

(22) Filed: Jan. 8, 2021

(65) Prior Publication Data

US 2021/0213586 A1    Jul. 15, 2021

(30) Foreign Application Priority Data

Jan. 9, 2020    (KR) .................. 10-2020-0003308

(51) Int. Cl.
*B24B 37/04* (2012.01)
*B24B 37/20* (2012.01)
(Continued)

(52) U.S. Cl.
CPC .............. *B24B 37/04* (2013.01); *B24B 37/20* (2013.01); *B32B 17/10* (2013.01); *B32B 37/08* (2013.01);
(Continued)

(58) Field of Classification Search
CPC ....... B24B 37/04; B24B 37/20; B24B 37/102; B32B 17/10; B32B 37/08;
(Continued)

(56) References Cited

U.S. PATENT DOCUMENTS 2,922,264 A * 1/1960 Wilson .................... B24B 35/00
                                                                451/28
3,110,988 A * 11/1963 Boettcher ............. B24B 37/102
                                                                451/286
(Continued)

FOREIGN PATENT DOCUMENTS

JP         2527910       3/1997
JP       2012-508452     4/2012
(Continued)

OTHER PUBLICATIONS

Office Action issued in KR Application No. 10-2020-0003308, dated Feb. 28, 2020.
Notice of Allowance issued in KR Application No. 10-2020-0003308, dated Aug. 26, 2020.

*Primary Examiner* — Joseph J Hail
*Assistant Examiner* — J Stephen Taylor
(74) *Attorney, Agent, or Firm* — Burris Law, PLLC

(57) ABSTRACT

A lapping apparatus includes a processing part and a fixing part. The processing part is provided for a target object to be seated and polishes a lower surface of the target object seated as it rotates. The fixing part is provided for pressing the seated target object against the processing part so that the lower surface of the target object is fixed in a state of being seated on the processing part. The fixing part rotates relative to the processing part along with the target object by shear force applied to the target object from the processing part so that the processing of the lower surface of the target object is made when the processing part rotates while the fixing part fixes the target object, and the location axes of the fixing part and the processing part do not match.

9 Claims, 11 Drawing Sheets

(51) Int. Cl.
   *B32B 17/10* (2006.01)
   *G02B 1/14* (2015.01)
   *B32B 37/08* (2006.01)
   *G02F 1/13* (2006.01)
   *B32B 38/00* (2006.01)

(52) U.S. Cl.
   CPC ............ *G02B 1/14* (2015.01); *G02F 1/1303* (2013.01); *B32B 2038/0064* (2013.01); *B32B 2457/202* (2013.01)

(58) Field of Classification Search
   CPC ...... B32B 2038/0064; B32B 2457/202; G02B 1/14; G02F 1/1303
   See application file for complete search history.

(56) References Cited

U.S. PATENT DOCUMENTS

| | | | |
|---|---|---|---|
| 6,012,967 A * | 1/2000 | Satake | .................. B24B 37/015 451/36 |
| 6,458,012 B1 | 10/2002 | Hirokawa et al. | |
| 8,295,967 B2 | 10/2012 | Zhang et al. | |
| 8,845,391 B2 * | 9/2014 | Sone | ....................... B24B 37/10 451/7 |

FOREIGN PATENT DOCUMENTS

| | | | | |
|---|---|---|---|---|
| JP | 2016-007652 | | 1/2016 | |
| KR | 10-2016-0043415 | | 4/2016 | |
| KR | 20160043415 A | * | 4/2016 | ............... B24B 7/24 |

* cited by examiner

LCD GLASS LAPPING APPARATUS

CROSS-REFERENCE TO RELATED APPLICATIONS AND PRIORITY CLAIM

This document claims under 35 U.S.C. § 119(a) priority to and the benefit of Korean Patent Application No. 10-2020-0003308, filed on Jan. 9, 2020, the entire contents of which are incorporated herein by reference.

BACKGROUND

Technical Field

The present disclosure relates to a lapping apparatus for the liquid crystal display (LCD) glass.

Related Art

On the surface of the external glass of a small mobile device, such as a cell phone, scratches may occur due to careless use. Recently, as flexible crystal liquid panels made of polymer material start to be used in cell phones, it becomes difficult technically to remove the exterior glass on which the scratches occurred from the liquid crystal panel and replace it with a new one, and further it becomes inefficient economically. Therefore, it may be more efficient way to remove the scratches in several micro-depth by lapping the glass surface while the glass is not separated from the liquid crystal panel.

However, according to a related art, it mainly uses a method of fixing the mobile device of a process target on a table and then polishing the target surface while adjusting a polishing instrument of a small size by using a CNC machine. Under this method, it is not easy to press the glass surface with the appropriate force by the polishing brush or pad, and there is a disadvantage that the abrasive powder cannot remain between the polishing pad and the glass and leave from the polishing pad and the glass.

SUMMARY OF THE DISCLOSURE

The present disclosure has been devised to solve the above problems and therefore an object thereof is to provide a lapping apparatus which is capable of polishing LCD glass evenly.

A lapping apparatus according to an embodiment of the present disclosure includes: a processing part which is provided for a process target object to be seated and polishes a lower surface of the process target object seated as it rotates; and a fixing part which is provided for pressing the seated process target object against the processing part so that the lower surface of the process target object is fixed in a state of being seated on the processing part, wherein the fixing part rotates relative to the processing part along with the process target object by the shear force applied to the process targe object from the processing part so that the processing of the lower surface of the process target object is made when the processing part rotates while the fixing part fixes the process target object, and the rotation axes of the fixing part and the processing part do not match, Preferably, the fixing part comprises a jig part including a jig which includes a jig opening that has a shape corresponding to the appearance of the process target object and opens along a vertical direction so that the process target object is inserted to be seated on the processing part and not to be separated in the horizontal direction, and posts extending upward from the jig; and a pad part including a pad placed on the upper side of the jig, which is provided to expand as air is injected and press the process target object inserted into the jig opening against the processing part, and a post linear bush into which the post is slidably inserted and of which the movement in the vertical direction is guided by the post.

Preferably, the pad part is further lowered as guided by the posts while the jig is seated on the processing part as the fixing part descends to reduce the distance spaced from the jig based on the vertical direction.

Preferably, the fixing part further comprises a location adjusting part for manually adjusting the distance in the vertical direction of the pad and the processing part when the pad approaches maximally to the processing part.

Preferably, the fixing part further comprises a lifting part for raising and lowering the pad so that the pad approaches the process target object seated on the processing part or is spaced apart from the process target object.

Preferably, the fixing part further comprises a rotary cylinder part including a cylinder housing and a rotary shaft which is rotatably coupled to the inside of the cylinder housing and is connected to the pad to support the rotation of the pad, wherein an air flowing path is formed to deliver air to the pad along the center of the rotary shaft.

Preferably, the fixing part is configured in plural so as to fix and process a plurality of process target objects, respectively, and the plurality of fixing parts are arranged such that a plurality of the process target objects fixed by each of the fixing parts are seated at the locations of the same distance from the center of the processing part at an angle to each other.

Preferably, the lapping apparatus further comprises an external frame coupled with the plurality of the fixing parts such that the plurality of the fixing parts are arranged at the locations of the same distance from the center of the processing part at an angle to each other.

Preferably, the processing part comprises an abrasive pad which is arranged facing the fixing part and to a fiber texture on the surface of which cerium powders are adsorbed.

Preferably, the lapping apparatus further comprises a cooling system including a temperature obtaining part that acquires the surface temperature of the processing part, a processor that determines whether cooling is required based on the obtained temperature of the processing part, and a feeding controller that provides the cooling water to the processing part when the processor determines that cooling is necessary.

Preferably, the processor determines a flow rate of the cooling water to be provided to the processing part based on the surface temperature of the processing part.

Preferably, the lapping apparatus further comprises a horizon adjusting screw that is installed on the external frame and moves the location of the fixing part in a horizontal direction as it is operated.

Preferably, the lapping apparatus further comprises leveling screws provided for adjusting the slope of the fixing part.

DETAILED DESCRIPTION

Figure 1:
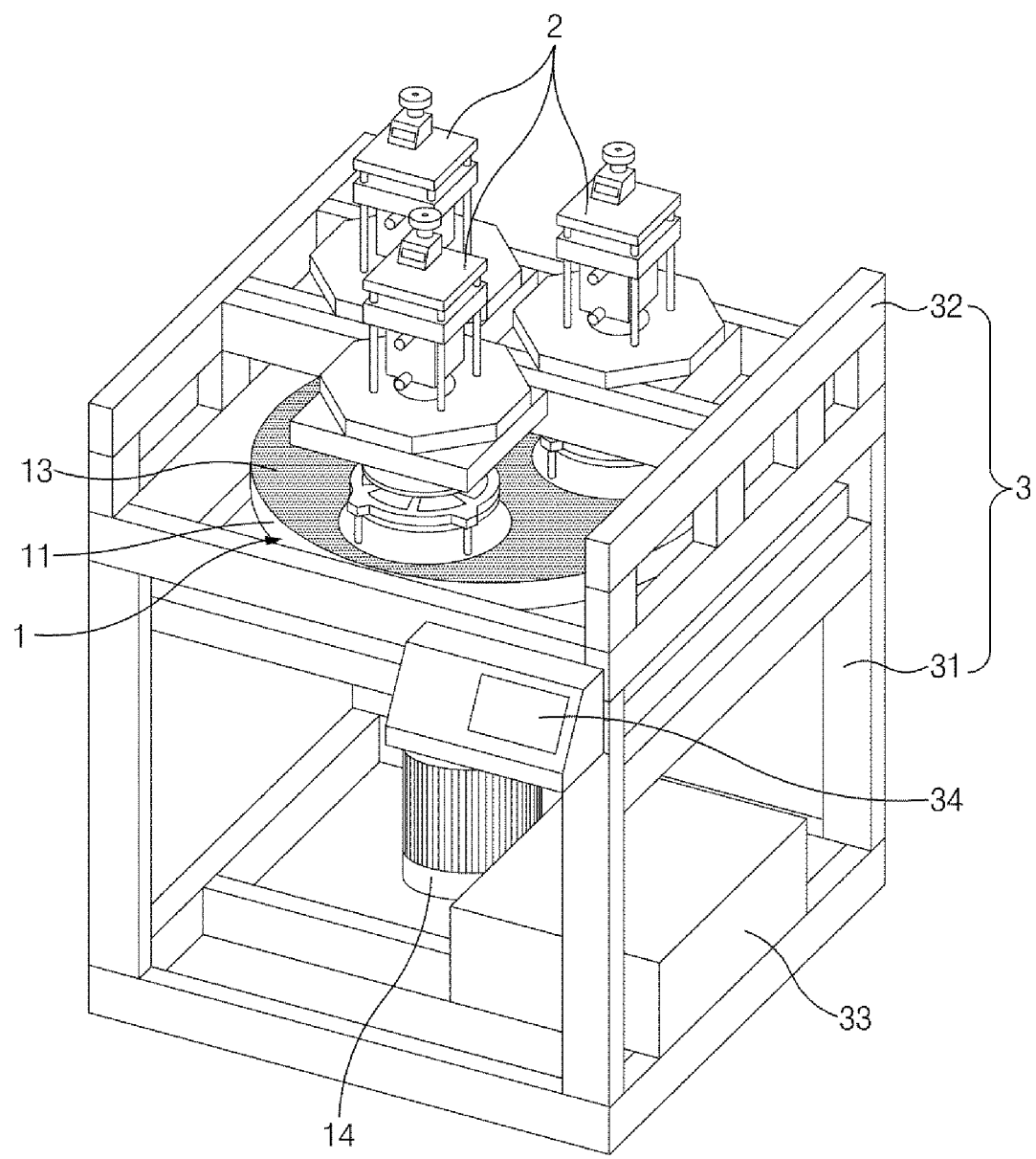
FIG. 1 is a perspective view of a lapping apparatus according to an embodiment of the present disclosure.

Hereinafter, some embodiments of the present disclosure will be described in detail with reference to the exemplary drawings. In adding reference numerals to components of each drawing, it should be noted that the same numerals are assigned to the same components of each drawing as possible even if they are indicated on different drawings. In addition, in describing an embodiment of the present disclosure, if it is determined that a detailed description of a related known configuration or function obstructs an understanding of the embodiment of the present disclosure, the detailed description thereof will be omitted.

In addition, in describing the components of the embodiment of the present disclosure, the terms such as first, second, (a), (b), and the like may be used. These terms are only used to distinguish the component from other components, and the nature or order of the component is not limited by the term. When a component is described as being "connected" or "coupled" to another component, it should be understood that the component may be directly connected or coupled to the other component, and another component can also be "connected" or "coupled" between each component.

FIG. 1 is a perspective view of a lapping apparatus according to one embodiment of the present disclosure.

Referring to the drawings, a lapping apparatus according to an embodiment of the present disclosure includes a processing part 1 and fixing parts 2, and an external frame 3 for fixing the processing part 1 and the fixing parts 2. Further, referring to FIG. 11 to be described later, the lapping apparatus may further include a cooling system 35.

External Frame 3

The external frame 3 may be the whole skeleton of the lapping apparatus. As illustrated, the external frame may be formed by combining a plurality of bars that are orthogonal to each other and meet, but the shape is not limited thereto. The external frame may include an upper external frame 32 and a lower external frame 31 located relatively lower than the upper external frame 32. In the external frame, a processing part 1, fixing parts 2, a cooling system 35, an air supply device 33 that supplies compressed air to the fixing part 2, and a control box 34 that is electrically connected to the other components for performing the control may be arranged.

The control box 34 may include a processor. The processor may include a microprocessor such as a Field Programmable Gate Array (FPGA), an Application Specific Integrated Circuit (ASIC), or a Central Processing Unit (CPU), but the type of the included computing device is not limited thereto.

In addition, the control box 34 may include a memory that stores a plurality of control instructions that serve as a basis for generating an instruction for controlling each component in the processor. The processor may be programmed such that the processor receives a control command from the memory and generates an electrical signal for controlling each component based on the received control command. The memory may be a data store such as a Hard Disk Drive (HDD), a Solid State Drive (SSD), a volatile medium, or a nonvolatile medium, but the type is not limited thereto.

In the control box 34, a device that receives a user's input to a processor and a device that displays information to be informed to the user may be disposed. For example, a display device may be used for input and display, but the type is not limited thereto.

The fixing part 2 may be installed on the external frame 3, and a plurality of fixing parts 2 may be disposed at different positions on the external frame 3. In an embodiment of the present disclosure, it is shown that three fixing parts 2 are disposed, but the number is not limited thereto. A plurality of fixing parts 2 may be coupled to the external frame to simultaneously fix a plurality of the target objects (T in FIG. 2) and it is capable of operating each of them. The target object (T in FIG. 2) may be an LCD glass, or a wireless communication device including an LCD glass.

In addition, the plurality of fixing parts 2 may be coupled to the external frame 3 such that the plurality of process target objects (T in FIG. 2) that are fixed by the respective fixing part 2 are seated and arranged at the locations of the same distance from the center of the processing part 1 at an angle to each other. The rotary table 11 and the abrasive pad 13 of the processing part 1 may be formed in a disk shape, and a plurality of fixing parts 2 may be arranged axially symmetrical with respect to an axis passing through the center of the disk in the vertical direction.

The lapping apparatus in which the fixing part is disposed on only one side of the processing part may be considered. This LCD glass lapping apparatus has a slow operation speed, and the pressure of the fixing part is biased to only one side of the rotary table, so there is a possibility that the horizontal state of the table may change over time. This may cause a problem in that the inclination of the processing part and rotary table must be adjusted frequently.

However, as the fixing parts 2 are disposed as in the exemplary embodiment of the present disclosure, a sufficient operation speed can be secured and the imbalance problem of the rotary table 11 can be solved.

A processing part 1 may be installed on the external frame 3. If the fixing part 2 is installed on the upper external frame 32, the processing part 1 may be installed on the lower external frame 31.

Processing Part 1

Figure 2:
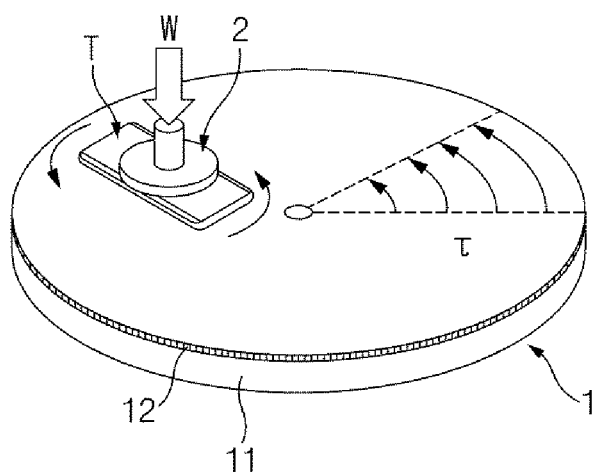
FIG. 2 is a schematic diagram conceptually illustrating an operation of a processing part and a fixing part of the lapping apparatus according to an embodiment of the present disclosure.

FIG. 2 is a schematic diagram conceptually illustrating the operations of processing part 1 and fixing parts 2 in the lapping apparatus according to one embodiment of the present disclosure.

Referring to the drawings, the processing part may include an abrasive pad 13 and a rotary table 11, and may further include a motor 14 of FIG. 3 with further reference to FIG. 3 to be described later.

Figure 3:
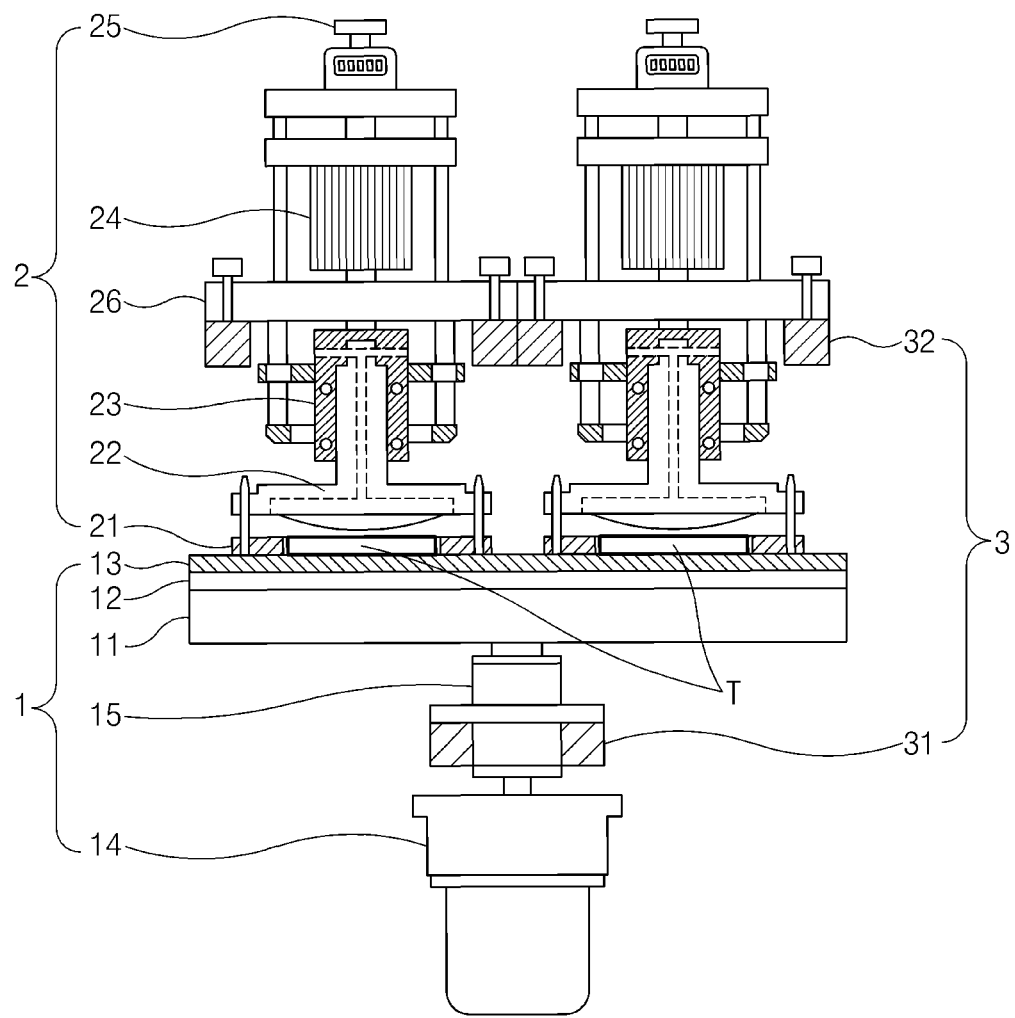
FIG. 3 is a longitudinal-section view of a part of the lapping apparatus according to an embodiment of the present disclosure.

On a rotary table 11 rotating by a motor 14 in FIG. 3, an abrasive pad 13 in which a cerium powder is adsorbed to a fiber texture on its surface may be attached via a magnetic mat 12 having a magnetic property. Therefore, the rotary table 11 and the abrasive pad 13 may be formed of a metallic material that can be fixed by magnetic force.

The abrasive pad 13 may be provided so that the process target object T is seated thereon, and as it rotates with the rotation of the rotary table 11 along with the magnetic mat 12, the lower surface of the process target object T can be polished by friction.

By applying vertical pressure W using a fixing part 2 on the process target object T placed between the center and circumference of the rotary table 11, the glass surface of the mobile phone adheres to the abrasive pad 13. In one embodiment of the present disclosure, the process target object T is described as a mobile phone to which an LCD glass is attached, but an LCD glass separated from the mobile phone may be used as the process target object T.

When the rotary table 11 rotates, a shear force T proportional to the distance from the center along the radius of the abrasive pad 13 is generated on the glass surface of the mobile phone in close contact with the abrasive pad 13 in the circumferential direction. At this time, the glass surface contacting the outer side of the abrasive pad 13 receives a greater shear force than the glass surface contacting the inner side, and due to this asymmetry of the shear force, the process target object T rotates about the center of the process target object T fixed by the fixing part 2, and the glass surface is polished by this relative rotation. Therefore, by using the LCD glass lapping apparatus of the present disclosure, the process target object T is driven only by the movement of the rotary table 11 and the fixing of the fixing part without a separate driving unit that directly rotates the mobile phone, and the glass surface is polished.

To support the rotation of the process target object T, a portion of the fixing part 2 holding the process target object T may rotate along with the process target object T. At this time, the rotation axis of the fixing part 2 and the rotation axis of the processing part 1 are parallel to each other but may not coincide.

When comparing the movement of the rotary table 11 and the process target object T, the outer side of the rotary table 11 rotates in the same direction, but the inner side of the rotary table 11 rotates in opposite directions to each other. Since the polishing is performed by friction, more polishing may occur while the process target object T passes inside the rotary table 11. By using such a means, uniform processing of the process target object T can be performed.

FIG. 3 is a longitudinal-section view of a part of the lapping apparatus according to one embodiment of the present disclosure.

The processing part includes a motor 14 connected to the rotary table and can generate rotational force using electric power. The motor 14 may be a gearbox built-in AC motor and may be coupled to the lower center of the rotary table 11 through a linear coupling box 15. Inside the coupling box 15, a bearing may be mounted so that the central axis of the rotary table 11 rotates without resistance.

The rotary table 11 may be formed in a disk shape having a diameter of 30 inches or more, and the abrasive pad 13 and the magnetic mat 12 may also be formed in a disk shape having the same diameter as the rotary table 11.

Fixing Part 2

Figure 4:
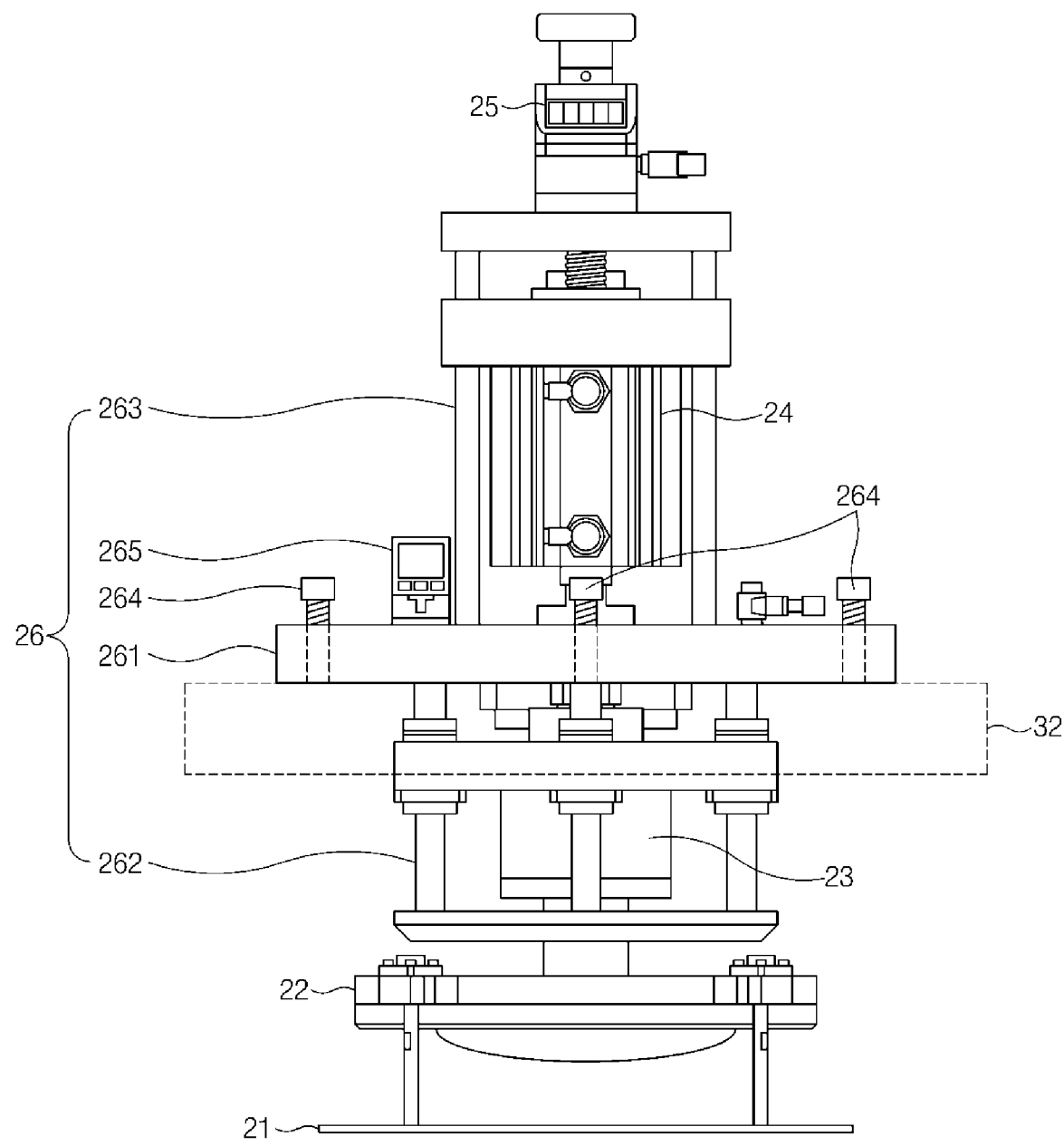
FIG. 4 is a view illustrating the fixing part of the lapping apparatus according to an embodiment of the present disclosure.
Figure 5:
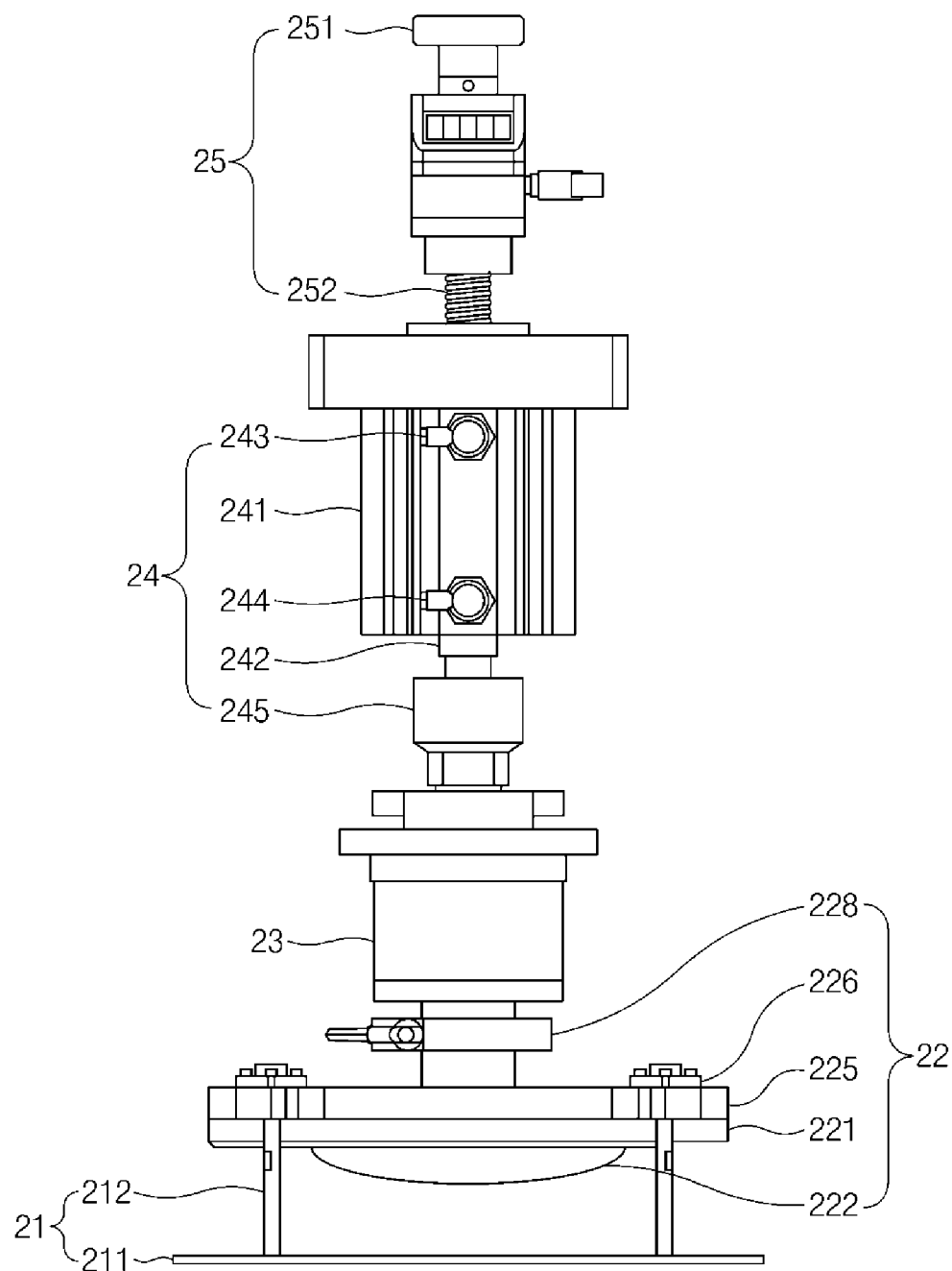
FIG. 5 is a view illustrating a state in which an exterior frame and a lifting part are removed from FIG. 4.

FIG. 4 is a view illustrating the fixing part 2 of the lapping apparatus according to an embodiment of the present disclosure. FIG. 5 is a view illustrating a state in which an external frame 32 and a head frame 26 are removed from FIG. 4.

The fixing part 2 serves to fix the process target object T. Specifically, the fixing part 2 is provided to press the seated process target object T against the processing part 1 so that the bottom surface of the processed object T is fixed while it is seated on the processing part 1.

Referring to the drawing, in the fixing part 2, a jig part 21, a pad part 22, a rotary cylinder part 23, a lifting part 24, and a location adjusting part 25 are coaxially coupled in order from the bottom of the drawing. The head frame 26 structure which will restrain them on the same central axis is connected with each element.

In the external frame 3, the lower external frame 31 and the upper external frame 32 are connected to a specific position of the processing part 1 and the fixing part 2 to support the entire system. The external frame 31 may be fastened to the processing part 1 at an external flange portion formed in the coupling 15. The external frame 3 may be fastened to the fixing part 2 at a horizontal support plate 261 of the head frame 26. However, the portion at which the processing part 1 and the fixing part 2 are fixed to the external frame 3 is not limited thereto.

The head frame 26 may include a horizontal support plate 261 and a bottom support 262 and a top support 263 connected up and down around the horizontal support plate 261.

A circular ring equipped with a linear bushing may be fastened to the bottom support 262. The bottom support 262 is connected to the rotary cylinder part 23 and serves to stably restrain the vertical movement of the rotary cylinder part 23. In addition, a plate coupled with linear bushing may be fastened to the top support 263, which serves to constrain the vertical movement of the lifting part 24 and to fix the location adjusting part 25.

As the horizontal support plate 261 is bolted onto the upper external frame 32, the fixing part 2 can be stably fixed. Leveling screws 264 for adjusting the slope of the fixing part 2 may be inserted into the screw holes passing through the horizontal support plate 261. When the screw is turned clockwise, the end of the screw protrudes below the horizontal support plate 261 and is blocked by the upper external frame 32, so it has the effect of lifting the horizontal support plate 261 and adjusting the slope of the fixing part 2.

The location adjusting part 25 mounted on the top of the fixing part 2 serves to determine the vertical position of the pad part 22 of the fixing part 2. By using the location adjusting part 25, it is possible to change the distance at which the pad part 22 can be maximally separated from the processing part 1 along the vertical direction. Further, by using the location adjusting part 25, it is possible to change the distance between the pad part 22 and the processing part 1 in the vertical direction when the pad part 22 approaches maximally to the processing part 1. Since the stroke of the lifting part 24 is limited, a user's operation using the location adjusting part 25 is needed to adjust minutely the distance such that the pad part 22 descends within an appropriate distance from the abrasive pad 13 to be in close contact therewith for polishing operation.

Specifically, the location adjusting part 25 includes ball screws 252 and an adjusting part 251 for operating the ball screws 252 and rotates the ball screws 252 so that the pad part 22 connected to the ball screw 252 can be lifted and lowered, but if there is a means capable of adjusting the height of the pad part 22 in the vertical direction, it is not limited thereto and other means can be used.

The lifting part 24 is a necessary component to move the rotary cylinder part 23 and the pad part 22 up and down. The lifting part 24 may lift and lower the pad 222 so that the pad 222 approaches the process target object T mounted on the processing part 1 or is spaced apart from the process target object T.

The lifting part 24 may include a cylinder box 241 and a transfer piston 242. Preferably, by using the fluid pressure as described above, when air is supplied to an upper inlet 243, the piston moves downward, and when air is supplied to the bottom inlet 244, the piston may move upward. However, if there is a means for adjusting the height of the pad part 22 in the vertical direction, it is not limited thereto and other means can be used.

Figure 6:
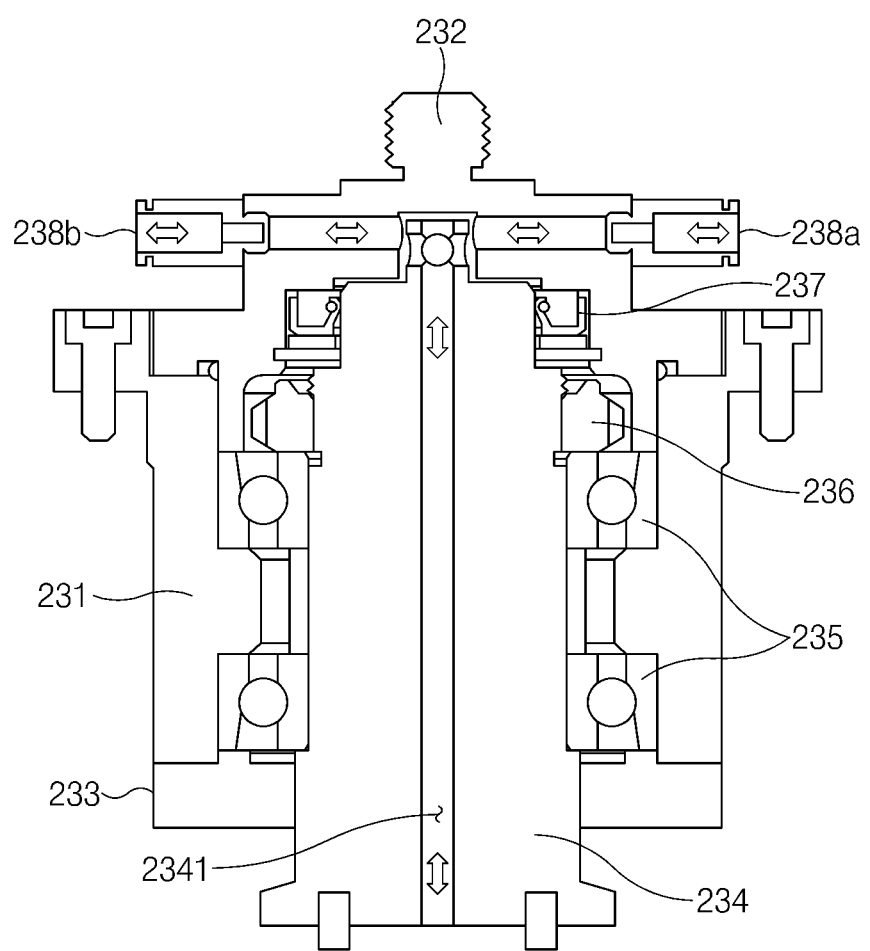
FIG. 6 is a longitudinal-section view of a rotary cylinder part according to an embodiment of the present disclosure.

FIG. 6 is a longitudinal-section view of the rotary cylinder part 23 according to an embodiment of the present disclosure. A floating joint 245 is fastened to the bottom of the lift piston 242 shaft, so that the lift piston 242 and the rotary cylinder part 23 can be connected to each other. The rotary cylinder part 23 may simultaneously function as a flow path for supplying compressed air to the pad part 22 and serve as a rotary device for allowing the pad part 22 to rotate freely.

The cylinder housing may include three parts. The cylinder housing may include an upper cylinder cover 232 and a lower cylinder base 233 around the center cylinder tube 231.

The bearing 235 is mounted inside the cylinder housing to enable smooth rotation of the rotary shaft 234. A lock nut 236 for preventing the rotary shaft 234 from being separated from the cylinder housing may be engaged with the bearing located at the upper side of the bearing 235. A sealing tube 237 for preventing leakage of air introduced into the cylinder housing may be inserted into the cylinder cover 232. These bearings 235, lock nuts 236, sealing tubes 237 surround the rotary shaft 234 and are arranged between the rotary shaft 234 and the inner surface of the cylinder housing to perform sealing or load support.

Inside the rotary shaft 234, an air channel 2341 may be drilled along the central axis. The air channel 2341 may communicate with the air inlets 238a and 238b formed on the cylinder cover 232, and may be connected to a pad 222 to be described later to deliver air to the pad 222. Since the rotary shaft 234 is coupled to the inside of the cylinder cover 232 to enable relative rotation, only the rotary shaft 234 rotates in conjunction with the rotation of the pad part 22 while the cylinder cover 232 is fixed, and at the same time, it is possible to supply air seamlessly to the pad 222.

One of the two air inlets 238a and 238b in the cylinder cover 232 may be connected to a pipe from the compressed-air supply device 33, and the other may be connected to an air pressure sensor 265.

In the rotary cylinder part 23, the cylinder housing 231 including the cylinder tube 231 may be bolted to the bottom support 262 and fixed so as not to rotate. At the bottom of the rotary shaft 234, a connection pin for mediating connection with the pad part 22 may be coupled. Due to this coupling structure, the rotary cylinder part 23 can rotate in conjunction with the rotation of the pad 222, and can mediate the lifting of the pad 222 since it is indirectly connected to the lifting part 24 and the pad 222.

Figure 7:
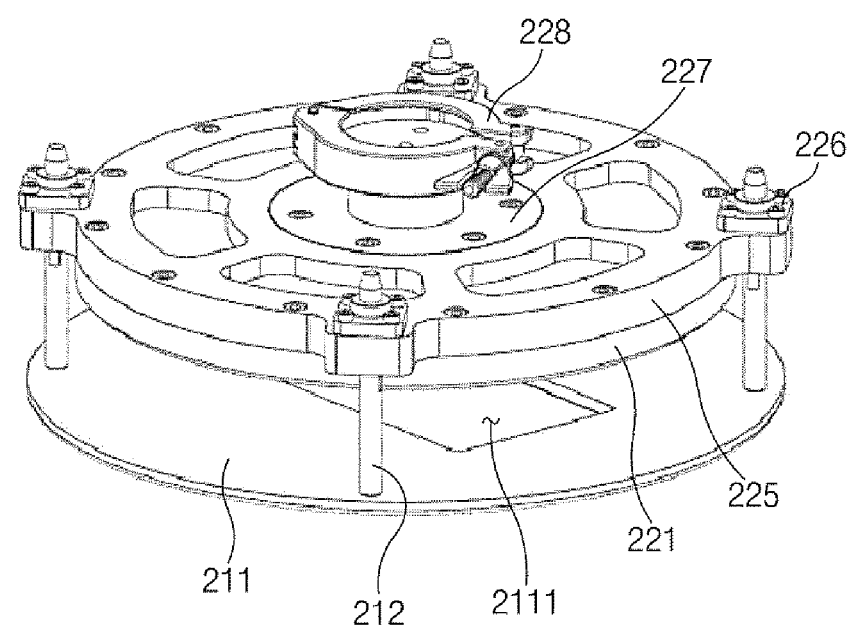
FIG. 7 is a perspective view of s jig part and a pad part according to an embodiment of the present disclosure.

FIG. 7 is a perspective view of the jig part 21 and pad part 22 according to an embodiment of the present disclosure.

Figure 8:
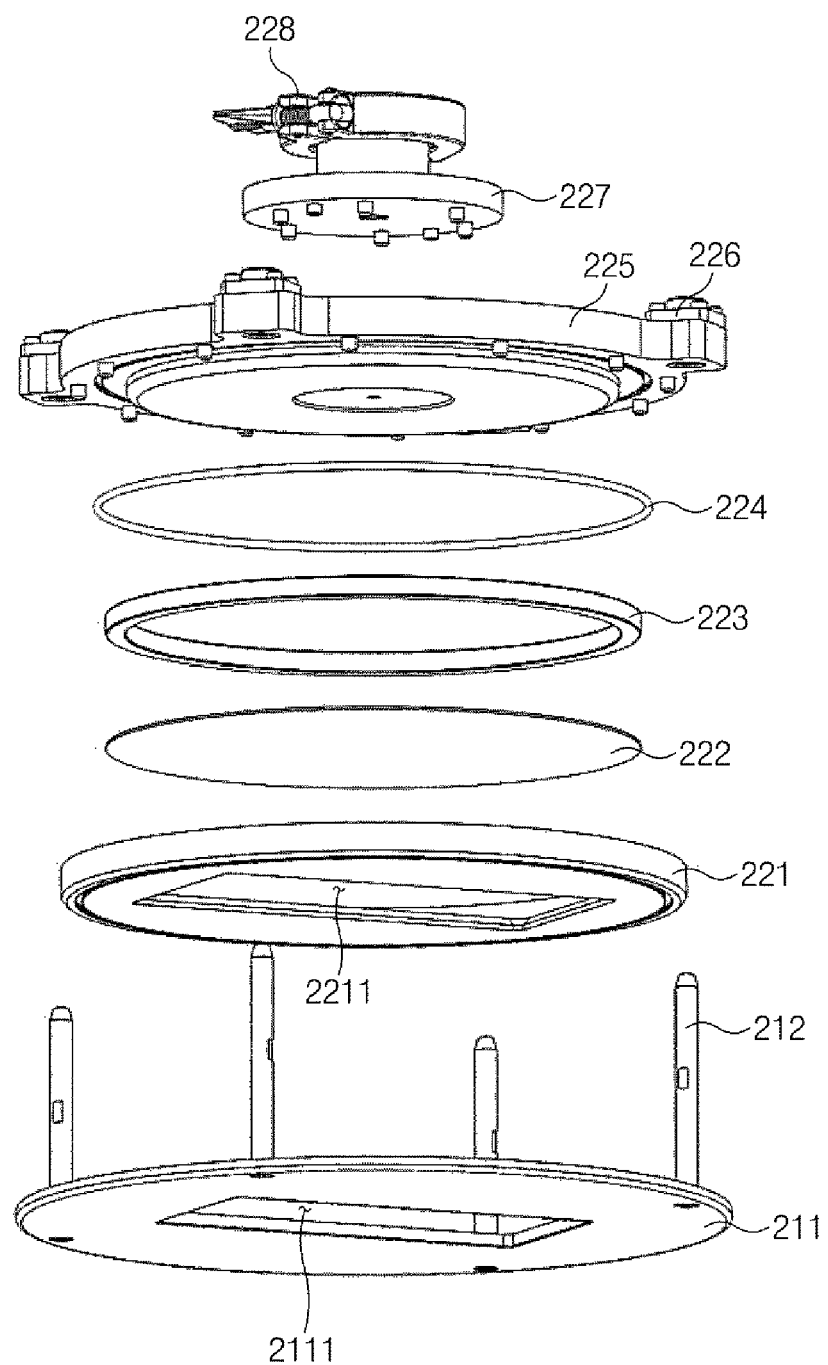
FIG. 8 is an exploded-perspective view of the jig part and the pad part according to an embodiment of the present disclosure.

FIG. 8 is an exploded-perspective view of the jig and pad part 22 according to an embodiment of the present disclosure.

The jig part 21 and the pad part 22 will be described with further reference to FIGS. 7 and 8. The pad part 22 is a part that directly presses the process target object T, including the expandable silicone pad 222, and the jig part 21 is the part that prevents the process target object T from being separated.

The pad part 22 may include a clamp 228. The clamp 228 may connect the rotary cylinder part 23 and the pad part 22. By using the clamp 228 the pad part 22 can be easily detached, allowing ease replacement of the pad part 22 for the process target object T of different types and sizes.

The pad part 22 may include a top plate 225 and a frame plate 221 coupled to each other by fasteners. Between the two plates 221, 225, a pad 222, an annular pad restraining ring 223 that presses the pad 222, and an annular rubber ring 224 for maintaining airtightness of the pad 222 may be inserted.

An adapter 227 for coupling with the rotary shaft 234 may be mounted on the top of the top plate 225. A clamp 228 may be coupled to the adapter 227. At the center of the adapter 227, a through path communicating with the air channel 2341 may be formed in order to send the compressed air introduced from the rotary shaft 234 to the top plate 225. The top plate 225 also has a through hole that communicates with the through path, so that air can be guided to the pad 222 or the air discharged from the pad 222 can escape therethrough.

The pad 222 may have a thickness of 1 mm, may be formed of a material having excellent flexibility, and preferably may be formed of silicone. The pad 222 expands when air is injected, and contracts when air escapes. As the pad 222 expands, it contacts the upper surface of the process target object T and presses the process target object T against the processing part 1, preventing the process target object T from being separated along a vertical direction and allowing the lower surface of the process target object T to be in close contact with the processing part 1.

The frame plate 221 of the pad part 22 may include a central frame opening 2211 opened in a rectangular shape. When the pad 222 expands downward by the inflow of air, the pad 222 is deformed into a three-dimensional shape similar to a rectangular parallelepiped through the frame opening 2211 to protrude downward and press the process target object T placed inside the jig opening 2111 of jig 211.

The size of the frame opening 2211 may be larger than that of the rectangular jig opening 2111 formed with being opened toward the jig 211. Therefore, the pad 222 can press the entire process target object T with a uniform pressure.

The jig part 21 is fitted between the abrasive pad 13 and the pad part 22 and may be used to prevent the process target object T from being separated when the rotary table 11 is driven. To this end, the thickness of the jig 211 needs to be similar to the thickness of the process target object T. The size of the jig opening 2111 of the jig 211 is preferably 2 to 3 mm larger than the horizontal and vertical length of the process target object T.

The jig opening 2111 has a shape corresponding to the appearance of the process target object T so that the process target object T can be inserted and seated on the processing part 1, and can be formed to be opened toward the processing part 1. Here, the shape corresponding to the appearance of the process target object T refers to a shape that has the numerical values corresponding to the numerical values of length, thickness, and width of the process target object, and has a linear shape or a curve that is formed on the appearance of the process target object to be corresponded to the numerical values.

The jig part 21 may further include a jig post 212 for fixing the position of the jig 211. One end of the jig post 212 is fastened to the edge of the jig 211, and the other end may be coupled to the top plate 225. By inserting the jig post 212 into the post linear bushing 226 that guides the movement of the jig post 212 in the vertical direction, which is mounted on the top plate 225, the vertical movement of the jig 211 can be freed, but the horizontal movement can be limited.

The jig 211 may be made of acryl or polycarbonate, and the thickness of the jig 211 decreases when a polishing operation is performed for a long time, and thus may be replaced periodically according to the usage period.

In addition, the lapping apparatus may further include a horizon adjusting screw (not shown). The horizon adjusting screw may be installed to the upper external frame 32 such that it is operated to move the fixing location of the fixing part 2 to the upper external frame 32 in a vertical direction along the upper external frame 32, or move outward the fixing part 2 from the upper external frame 32. By adjusting the position of the fixing part 2 the imbalance occurred while the fixing part 2 is driven can be corrected.

Figure 9:
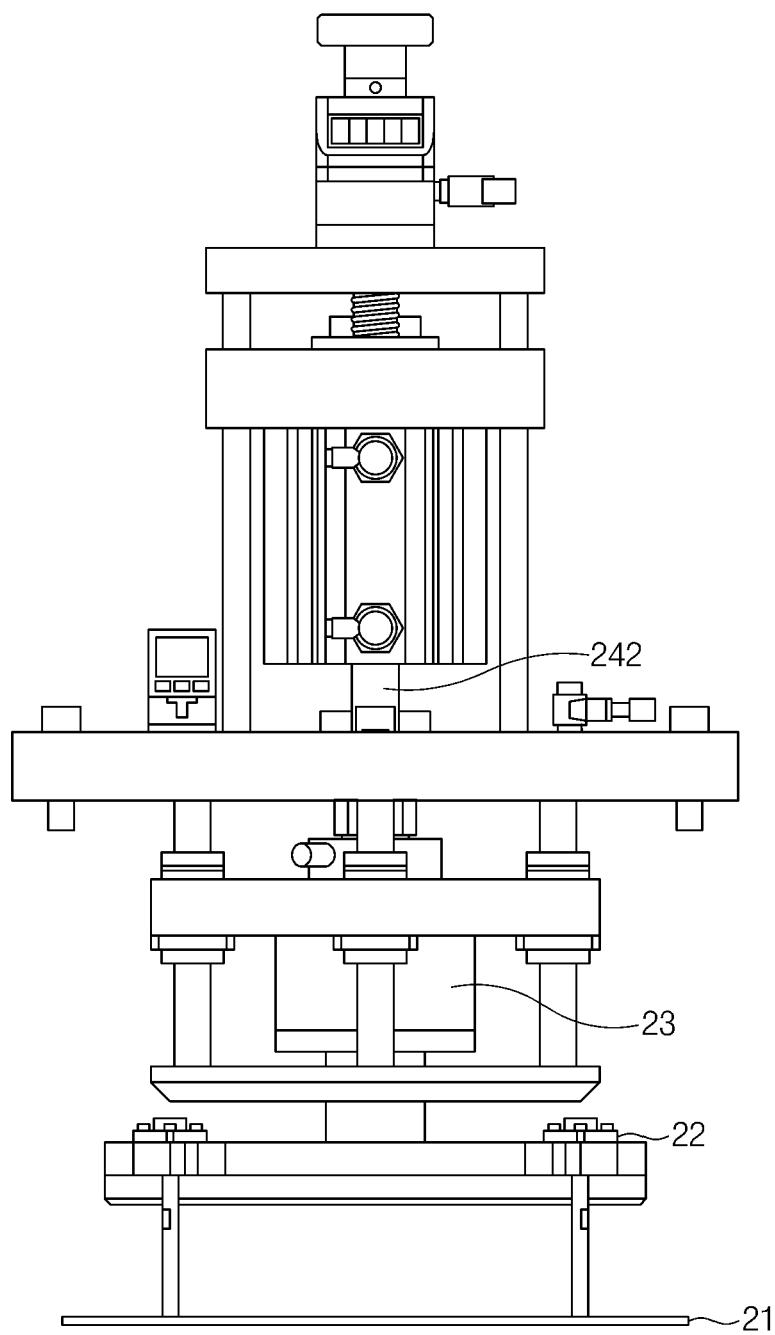
FIG. 9 is a perspective view illustrating state before a pad is in close contact with the process target object according to an embodiment of the present disclosure.
Figure 10:
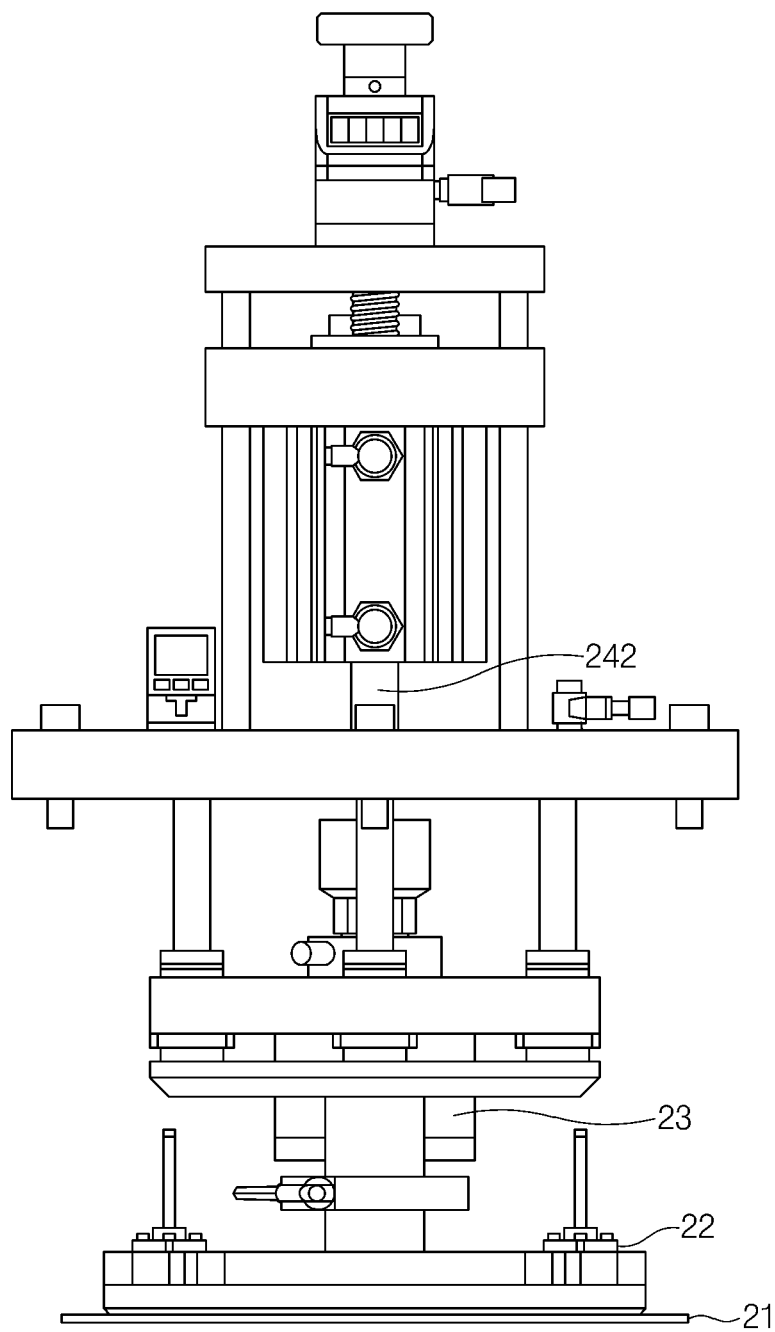
FIG. 10 is a perspective view illustrating a state in which a pad is in close contact with the process target object according to an embodiment of the present disclosure.

FIG. 9 is a perspective view illustrating a state before the pad 222 is in close contact with the process target object T according to an embodiment of the present disclosure. FIG. 10 is a perspective view illustrating a state in which the pad 222 is in close contact with the process target object T according to an embodiment of the present disclosure.

With further reference to FIGS. 9 and 10, the fixing action of the process target object T by the action of the pad part 22 will be described.

The jig 211 may be seated on the abrasive pad 13. In the state of FIG. 9, by inserting the process target object T into the jig opening 2111 so that the glass surface of the process target object T is directed downward, and operating the lift piston 242 of the lifting part 24 to lower the pad part 22, its position can be converted into the state of FIG. 10.

By controlling the control box 34, air is injected into the pad 222, and it can be confirmed with the air pressure sensor 265 that pressure is filled in the pad 222. If necessary, the pressure can be adjusted to suit the state suitable for polishing.

When the operation time is input and the rotary table 11 is driven, the rotary shaft of the rotary cylinder part 23 that presses the process target object T and the pad part 22 is driven. In addition, the process target object T, which is in close contact with the pad 222, also rotates about the rotation axis of the rotary cylinder part 23, and the polishing operation as shown in FIG. 2 is started.

Even without the function of adsorbing the process target object in this way, polishing can be performed using only the rotation of the rotary table 11 while pressing the process target object T, preventing problems such as the reverse flow of the polishing solution into the adsorption pipe while the air is sucked through the adsorption pad or the appearance of the process target object T being soiled with the polishing solution.

Cooling System 35

Figure 11:
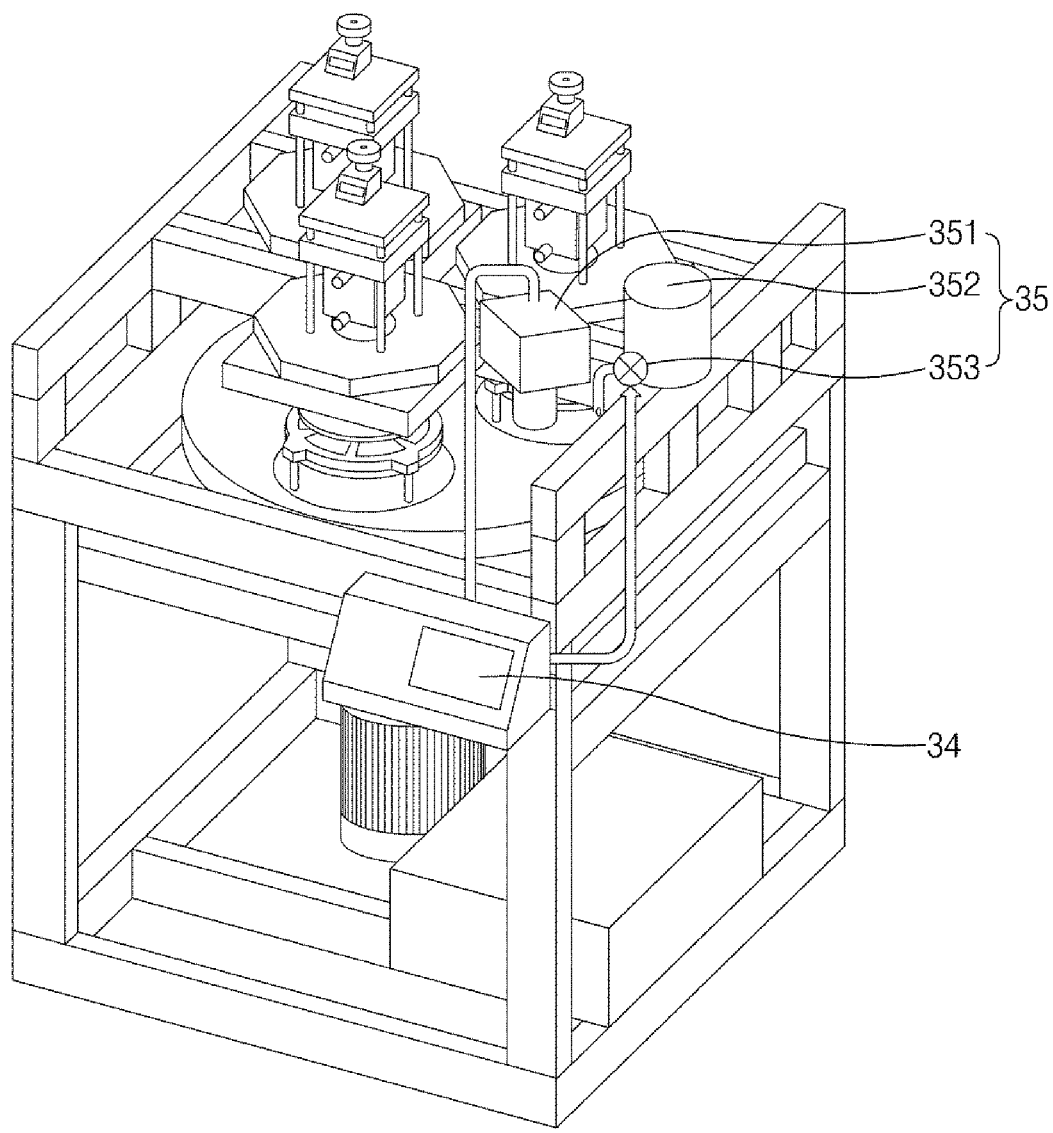
FIG. 11 is a perspective view illustrating a cooling system of the lapping apparatus according to an embodiment of the present disclosure.

FIG. 11 is a perspective view illustrating the cooling system 35 of the lapping apparatus according to an embodiment of the present disclosure.

The cooling system 35 will be described with further reference to FIG. 11. In the present disclosure, a polishing solution may not be separately used, but a cooling system 35 for automatically supplying cooling water for cooling the frictional heat of the abrasive pad 13 may be included.

The cooling system 35 includes a temperature obtaining part 351 and may monitor the surface temperature of the abrasive pad 13 in real time. The temperature obtaining part 351 may preferably include an infrared temperature sensor that obtains the surface temperature of the abrasive pad 13 in a non-contact manner, but the temperature obtaining means is not limited thereto.

When the obtained surface temperature rises above a predetermined value, the processor of the control box 34 determines that cooling is necessary and operates the feeding controller 353 to provide the cooling water stored in the cooling water reservoir 352 to the abrasive pad. have. When the surface temperature of the abrasive pad 13 is less than a specific value, the processor determines that cooling is not required and can control the feeding controller 353 to stop. The feeding controller 353 may be a valve, and the cooling water reservoir 352 may be a tank in which the cooling water can be stored.

The flow rate of the cooling water provided by the feeding controller 353 may be determined based on the obtained surface temperature. The processor can provide a higher flow rate of the cooling water as the surface temperature increases.

In the above, even if all the components constituting the embodiments of the present disclosure have been described as being combined into one or operating in combination, the present disclosure is not necessarily limited to these embodiments. That is, as long as it is within the scope of the object of the present disclosure, one or more of all the components may be selectively combined and operated. In addition, the terms such as "include", "consist of" or "have" described above mean that the corresponding components may be present unless otherwise specified. Therefore, it should be construed that other components may be further included rather than excluding other components. All terms, including technical or scientific terms, have the same meaning as commonly understood by a person having ordinary skill in the art, unless otherwise defined. Generally used terms, such as terms defined in the dictionary, should be interpreted as being consistent with the meaning of the context of the related technology, and are not interpreted as ideal or excessively formal meanings unless explicitly defined in the present disclosure.

The above description is only illustrative of the technical idea of the present disclosure, and those having ordinary skill in the art to which the present disclosure pertains will be able to make various modifications and variations without departing from the essential characteristics of the present disclosure. Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the following claims, and all technical ideas within the scope equivalent thereto should be interpreted as being included in the scope of the present disclosure.

What is claimed is:

1. A lapping apparatus, comprising:
a processing part including an abrasive pad that polishes a lower surface of a process target object seated thereon as the processing part rotates; and
at least one fixing part that presses the seated process target object against the processing part so that the lower surface of the process target object is fixed in a seated state on the processing part, wherein:

the at least one fixing part rotates relative to the processing part along with the process target object by shear force applied to the process target object from the processing part so that the processing of the lower surface of the process target object is performed when the processing part rotates while the at least one fixing part fixes the process target object, and rotation axes of the at least one fixing part and the processing part do not match, wherein the at least one fixing part further comprises:

a jig part including:

a jig which includes a jig opening that has a shape corresponding to an appearance of the process target object and opens along a vertical direction so that the process target object is inserted to be seated on the processing part and not to be separated in the horizontal direction, and posts extending upward from the jig; and a pad part including:

a pad placed on the upper side of the jig, which is provided to expand as air is injected and press the process target object inserted into the jig opening against the processing part, and a post linear bushing, into which posts are slidably inserted and of which a relative movement of the pad to the jig in the vertical direction is guided by the posts;

wherein the pad part is further lowered as the pad slides along the posts and is guided by the posts to reduce a distance to the jig based on the relative movement of the pad to the jig in the vertical direction; and the pad presses the process target object when the pad part descends to have no distance from or be proximate to the jig.

2. The lapping apparatus according to claim 1, wherein the at least one fixing part further comprises a location adjusting part for manually adjusting the distance in the vertical direction of the pad and the processing part when the pad approaches maximally to the jig, wherein the location adjusting part includes ball screws connected to the pad part.

3. The lapping apparatus according to claim 1, wherein the at least one fixing part further comprises a lifting part for lifting and lowering the pad so that the pad approaches the process target object seated on the jig or is spaced apart from the process target object, wherein the lifting part includes air cylinder structure.

4. The lapping apparatus according to claim 1, wherein the at least one fixing part further comprises:

a rotary cylinder part including a cylinder housing and a rotary shaft which is rotatably coupled to the inside of the cylinder housing and is connected to the pad to support the rotation of the pad, wherein an air flowing path is formed to deliver air to the pad along the center of the rotary shaft.

5. The lapping apparatus according to claim 4, wherein the at least one fixing part further comprises a plurality of fixing parts so as to fix and process a plurality of process target objects, respectively, and the plurality of fixing parts are arranged to fix the plurality of process target objects seated at equal angles at the locations of the same distance from the center of the processing part.

6. The lapping apparatus according to claim 5, further comprising an external frame coupled with the plurality of the fixing parts such that the plurality of the fixing parts are arranged at equal angles at the locations of the same distance from the center of the processing part.

7. The lapping apparatus according to claim 1, wherein:

the abrasive pad which is arranged facing the at least one fixing part, and cerium powders are adsorbed to a fiber texture on the surface of the abrasive pad.

8. The lapping apparatus according to claim 1, further comprising:

a cooling system including a temperature obtaining part that acquires the surface temperature of the processing part, a processor that determines whether cooling is required based on the obtained surface temperature of the processing part, and a feeding controller that provides the cooling water to the processing part when the processor determines that cooling is necessary.

9. The lapping apparatus according to claim 8, wherein the processor determines a flow rate of the cooling water to be provided to the processing part based on the surface temperature of the processing part.

* * * * *